(12) United States Patent
Sankararamalingam et al.

(10) Patent No.: US 9,806,768 B2
(45) Date of Patent: Oct. 31, 2017

(54) METHODS AND DEVICE FOR CONTROLLING POWER TRANSMISSION USING NFC

(71) Applicant: Samsung Electronics Co. Ltd., Suwon-si, Gyeonggi-do (KR)

(72) Inventors: Kandaswami Sankararamalingam, Bangalore (IN); Kiran Kumar Makam Nataraja, Bangalore (IN); Lakshmi Narayana Thummala, Bangalore (IN); Vishwajeet Wadhwa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 13/945,328

(22) Filed: Jul. 18, 2013

(65) Prior Publication Data

US 2014/0021799 A1    Jan. 23, 2014

(30) Foreign Application Priority Data

Jul. 19, 2012  (IN) ............................ 2951/CHE/2012

(51) Int. Cl.
    *H04B 5/00* (2006.01)
(52) U.S. Cl.
    CPC ......... *H04B 5/0037* (2013.01); *H04B 5/0031* (2013.01)
(58) Field of Classification Search
    CPC ....... H04B 5/0025–5/0093; H02J 5/005; H02J 7/025; H02J 17/00; B60L 5/005; B60L 11/182; B60L 11/1829–11/1831; H01F 38/14; H01F 2038/143–2038/146; A61N 1/3787; A61B 1/00029
    USPC .......................................... 307/104; 320/108
    See application file for complete search history.

(56) References Cited

U.S. PATENT DOCUMENTS

| | | |
|---|---|---|
| 2008/0272889 A1 | 11/2008 | Symons |
| 2010/0190436 A1 | 7/2010 | Cook et al. |
| 2010/0201310 A1 | 8/2010 | Vorenkamp et al. |
| 2010/0201313 A1 | 8/2010 | Vorenkamp et al. |
| 2010/0207575 A1 | 8/2010 | Pijnenburg et al. |
| 2011/0136550 A1 | 6/2011 | Maugars |
| 2011/0215756 A1 | 9/2011 | Shimizu |
| 2011/0221389 A1 | 9/2011 | Won et al. |

FOREIGN PATENT DOCUMENTS

| | | |
|---|---|---|
| EP | 1 898 592 A1 | 3/2008 |
| KR | 10-2011-0135540 A | 12/2011 |
| KR | 10-1136917 B1 | 4/2012 |
| WO | 2009/045085 A1 | 4/2009 |

*Primary Examiner* — Rexford Barnie
*Assistant Examiner* — Thai Tran
(74) *Attorney, Agent, or Firm* — Jefferson IP Law, LLP (57) ABSTRACT

A method and system to control power transmission between two Near Field Communication (NFC) devices with and without data transfer using NFC technology are provided. The method includes transferring at least a portion of power between two NFC devices using different RF signals and appropriate NFC Transceivers. The method controls the power transmission between two NFC devices by proposed changes in NFC Digital Protocol, LLCP (Logical Link Control Protocol) and in the application flow control.

15 Claims, 7 Drawing Sheets

METHODS AND DEVICE FOR CONTROLLING POWER TRANSMISSION USING NFC

CROSS-REFERENCE TO RELATED APPLICATION(S)

This application claims the benefit under 35 U.S.C. §119 (a) of an Indian patent application filed on Jul. 19, 2012 in the Indian Patent Office and assigned Serial No. 2951/CHE/2012, the entire disclosure of which is hereby incorporated by reference.

TECHNICAL FIELD

The present disclosure relates to Near Field Communication (NFC). More particularly, the present disclosure relates to power transmission between two NFC enabled devices.

BACKGROUND

Mobile devices are becoming a necessity in today's business world that is going digital with functionality such as digital coupons, digital information transfer, digital payments, and the like. High end mobile devices are incorporating new emerging Near Field Communication (NFC) technology into them. NFC is a standards-based, short range connectivity technology, which harmonizes today's diverse contactless technologies, enabling current and future solutions in areas such as access control, consumer electronics, healthcare, information collection and exchange, loyalty and coupons, payments, transport and the like. NFC follows universally implemented International Organization for Standardization (ISO), European Computer Manufacturers Association (ECMA), and European Telecommunications Standards Institute (ETSI) standards.

To keep these mobile devices operational they have to be charged frequently. For many years mobile device charging was done by traditional mobile chargers using cables. With the rapid technological advancements in mobile technology, different wireless charging technologies have come into existence. Existing wireless charging systems such as WildCharge or Powermat are vendor specific and are not applicable to most mobile or portable devices. Moreover, these charging technologies need an additional charging system having a separate antenna and circuitry, where the mobile device has to be kept in contact with the charging system, such as a charging pad in the Wildcharge system. These charging systems only function as power transmitters and do not involve any data transmission function.

Due to above mentioned reasons, it is evident that the existing wireless charging systems for NFC enabled devices fails to transfer power without the use of additional system and requires separate systems to transfer power between NFC enabled devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system to control power transmission with or without data transmission between two Near Field Communication (NFC) enabled devices using NFC technology.

Another aspect of the present disclosure is to provide a voltage/current sensing module, a control module, and a regulator module in existing NFC device design which enable and control data and power transmission.

Another aspect of the present disclosure is to provide changes in existing NFC protocols to enable and control power transmission with or without data transmission between two NFC enabled devices.

In accordance with an aspect of the present disclosure, a method to transfer power between an initiator NFC device and a target NFC device is provided. The method includes transferring at least a portion of power in the initiator NFC device to the target NFC device.

In accordance with another aspect of the present disclosure, an initiator NFC device for transferring power is provided. The NFC device includes an antenna, and a circuit. The circuit comprises one or more of an NFC operational components module, a voltage sensing module, a current sensing module, a control module, a regulator module, or a power module. The initiator NFC device is configured to transfer power by modifying one or more of a digital protocol, a Logical Link Control Protocol (LLCP), or an application flow control of the initiator NFC device.

In accordance with another aspect of the present disclosure, a target NFC device for receiving power transferred from an initiator NFC device is provided. The target device includes an antenna, and a circuit. The circuit includes one or more of an NFC operational components module, a voltage sensing module, a current sensing module, a control module, a regulator module, or a power module. The target NFC device is configured to receive the power from the initiator by modifying one or more of a digital protocol, an LLCP, or an application flow control of the target NFC device.

In accordance with another aspect of the present disclosure, an NFC device is provided. The NFC device includes an antenna, and a circuit. The circuit includes one or more of an NFC operational components module, a voltage sensing module, or a current sensing module. The voltage sensing module and the current sensing module detect power required for activating the NFC operational components module from the power induced in antenna. The excess power is used to charge a battery present in power module. The NFC device further includes a regulator module configured to regulate the power to charge the battery, and a control module configured to control operation of one or more of the voltage sensing module, the current sensing module, the regulator module, or the NFC operational components module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The short-range communication may include a Bluetooth, an Infrared Data Association (IrDA), a WiFi-Direct communication, an Near Field Communication (NFC) and a Visible Light Communication.

The embodiments that will be described below relate to an Near Field Communication as an embodiment of the short-range communication.

The various embodiments described herein achieve a method and system that enables power transmission between two Near Field Communication (NFC) enabled devices using NFC technology. The method provides different modes of power transmission that enables controlled power transmission, with or without data being transmitted between the NFC enabled devices. Further, the system provides modifications to existing NFC enabled device design and in the standard NFC protocols layers to enable the wireless power transmission using existing NFC systems. The modifications enable power transmission between two NFC enabled devices. These modifications can be made in any of the standard NFC protocol, such as the digital protocol, the Logical Link Control Protocol (LLCP), or using any application logic.

Throughout the description, the term power may refer to electrical power or electrical energy.

Referring now to the drawings, and more particularly to FIGS. 1 to 8, where similar reference characters denote corresponding features consistently throughout the figures, there are shown various embodiments.

Figure 1:
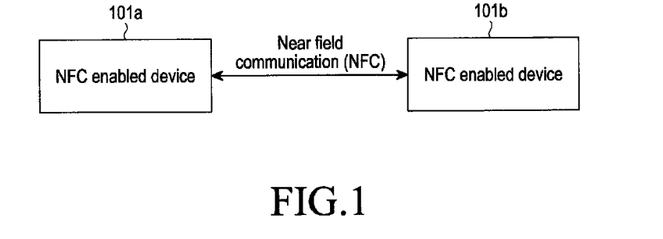
FIG. 1 illustrates a general block diagram explaining an overview of Near Field Communication (NFC) according to various embodiments of the present disclosure.

FIG. 1 illustrates a general block diagram explaining an overview of NFC according to various embodiments of the present disclosure.

Referring to FIG. 1, the figure depicts an NFC enabled device 101a and an NFC enabled device 101b. Both of the NFC enabled devices 101a and 101b communicate with each other using NFC. Both of the NFC enabled devices 101a and 101b include a power supply unit and are active NFC devices. The communication between these active NFC enabled devices is called peer to peer mode of communication with respect to NFC standard and allows bidirectional communication. The NFC enabled device 101a that needs power may be referred to as a target while the NFC enabled device 101b which can supply power may be referred to as an initiator. These NFC enabled devices communicate with each other using a predefined protocol. This short range NFC communication takes place over carrier of 13.56 MHz as per NFC standard. The power transfer can take place between these devices, with or without data transfer with the help of a modified NFC enabled device design along with modifications in the standard NFC protocol such as the digital protocol, the LLCP, or using any application logic.

Figure 2:
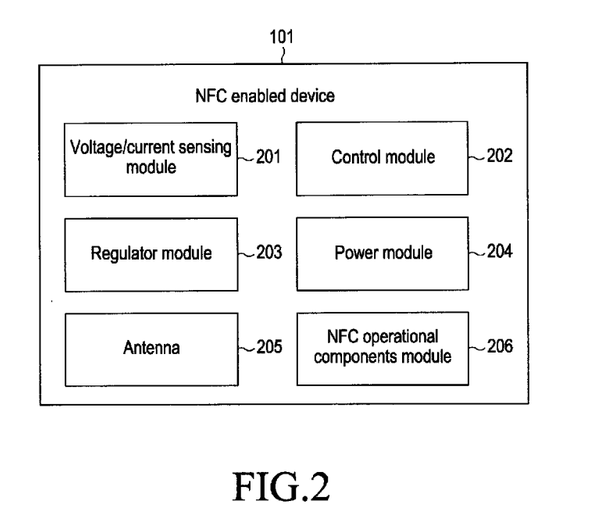
FIG. 2 illustrates a general block diagram of an NFC enabled device according to various embodiments of the present disclosure.

FIG. 2 illustrates a general block diagram of an NFC enabled device according to various embodiments of the present disclosure.

Referring to FIG. 2, the figure depicts modifications in existing NFC enabled device design to control in various modes to transfer data, power, and power along with data transmission. The NFC enabled device 101 comprises a voltage/current sensing module 201, a control module 202, a regulator module 203, a power module 204, an antenna 205, and an NFC operational components module 206. The voltage/current sensing module 201 determines the power required for activating NFC operational components module 206 from the power induced in the NFC antenna 205. Any excess power received is used to charge a battery present in the power module 204 using the regulator module 203. The control module 202 controls the operation of the voltage/current sensing module 201, the regulator module 203, and the NFC operational components module 206 in different modes based on the control signals received from NFC operational components module 206.

The standard NFC operational components module 206 includes an NFC processor, a Phase Lock Loop (PLL), a modulator/demodulator, and other circuits used for normal NFC communication. The regulator module 203 regulates the power to charge the battery present in the power module 204. The intermediate power storage and regulator circuit is present in the regulator module 203. The control module 202 is used to switch the NFC enabled device 101 between different modes to control data transfer, power transmission, and data transfer with power transmission by controlling one or more of the voltage/current sensing module 201, the regulator module 203, and the NFC operational components module 206 based on the control signals received from the NFC operational components module 206.

Figure 3:
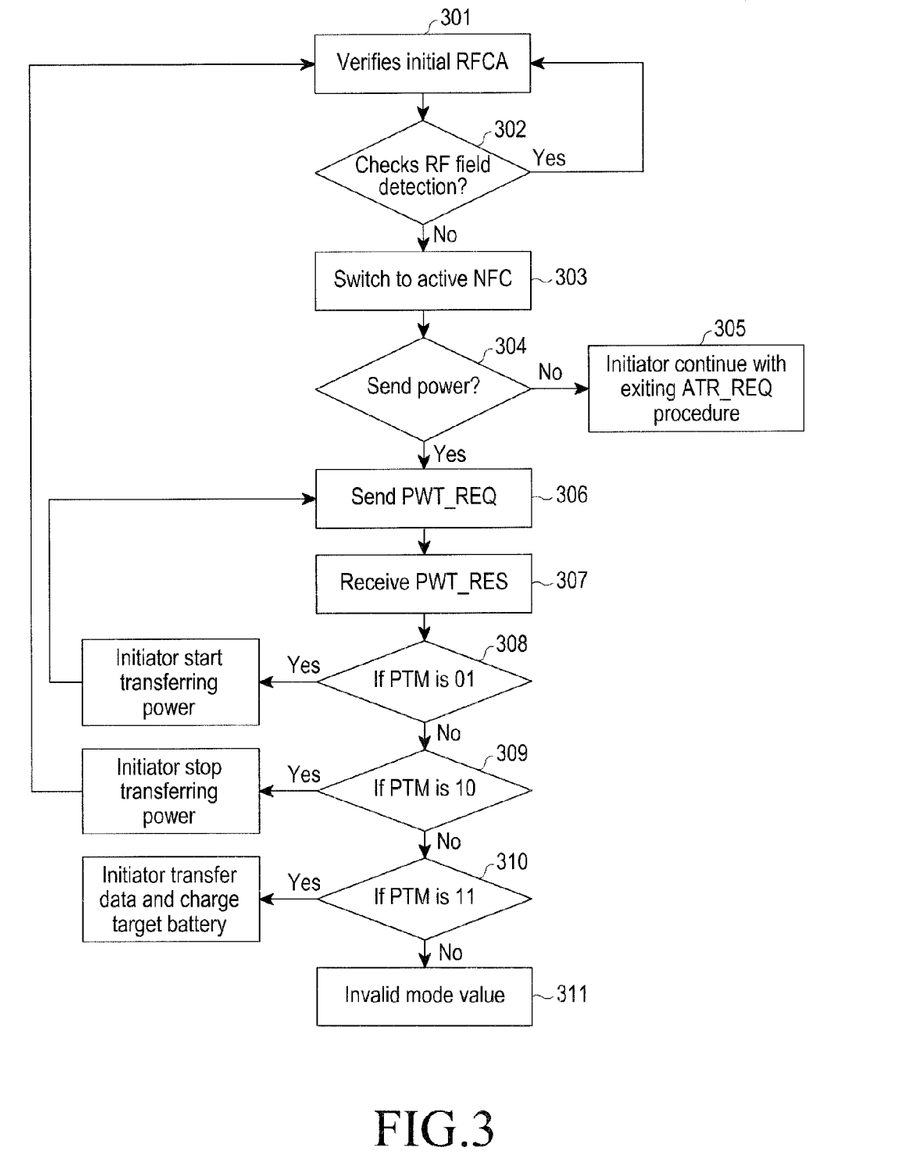
FIG. 3 illustrates a flow diagram of digital protocol activation and power transmission according to various embodiments of the present disclosure.

FIG. 3 illustrates a flow diagram of digital protocol activation and power transmission according to various embodiments of the present disclosure.

Referring to FIG. 3, the digital protocol activation sequence in the initiator may employ a modified NFC digital protocol referred to as the NFC Power Transmission (NFC-PWT) protocol. This NFC-PWT protocol describes an approach to transfer power between NFC forum device NFC-A and NFC-F.

The NFC Forum defines different air interfaces (NFC-A, NFC-B, and NFC-F) in the NFC Analogue Specification to ensure backwards compatibility. The specifications for NFC are based on the RFID standards ISO/IEC 14443A (NFC-A), ISO/IEC 14443B (NFC-B) and JIS X6319-4, also known as FeliCa (NFC-F).

The initiator initially verifies at operation 301 the NFC enabled devices for RF Collision Avoidance (RFCA). As per NFC standards, to avoid disturbing any other NFC communication and any current infrastructure running on the carrier frequency, the initiator for NFC communication will not generate an RF field as long as another RF field is detected. Any Near Field Communication Interface and Protocol (NFCIP)-1 device by default will be in target mode and will not generate a RF field; rather, the NFCIP-1 device will wait for a command from the initiator. The NFCIP-1 device may switch to the initiator mode if needed by the application.

The initiator determines at operation 302 whether an external RF field is present and will not activate the RF field if an external RF field is detected. If an external RF field is not detected within a predefined time T, the initiator switches at operation 303 to active NFC mode and activates the RF field. The target will be activated by the RF field of the initiator. Once the technology detection and collision resolution are completed during device activation activity, NFC-PWT protocol will be initiated. The initiator determines at operation 304 whether a request to send power has been made. If power is not required (i.e., no request to send power has been made) the initiator continues at operation 305 with the existing ATR_REQ procedure as defined in ISO/IEC_18092 followed by PSL_REQ and Data Exchange Protocol (DEP). If a power transfer request is detected, then the initiator sends at operation 306 a Power Transmission Request (PWT_REQ) command to the target. In response to initiator's command, the target sends a Power Transmission Response (PWT_RES) for Power Transmission Request. The initiator, on receiving at operation 307 the PWT_RES from the target, determines the power transmission mode to be carried out with the target. The payloads between NFC forum devices include commands from the initiator and responses from the target as given in Table 1.

TABLE 1

| Initiator (Command) | Target (Response) |
|---|---|
| PWT_REQ | PWT_RES |

The initiator gives details of the command Power Transmission Request PWT_REQ with all its parameter bytes. The initiator will send the PWT_REQ to the selected target device. Hereinafter, the subscripts i and t represent the initiator and the target command respectively. The PWT_REQ format is given in Table 2 below.

TABLE 2

| BYTE1 | BYTE2 | BYTE3 | . | BYTE12 | BYTE13 | BYTE14 |
|---|---|---|---|---|---|---|
| D4 | 0C | NFCID3i 0 | . | NFCID3i 9 | PTCi | PCPi |

As depicted in Table 2, Byte 3 includes NFCID3i, which is the NFC forum NFCIP-1 identifier of the initiator for the NFC-PWT protocol, and byte 13 indicates the initiator device Power Transmission Capacity (PTC). The PTCi is used to indicate the target device that the initiator will transmit power for the specific amount of time value mentioned in PTCi. The PTCi format is given in Table 3 below.

TABLE 3

| b8 | b7 | b6 | b5 | b4 | b3 | b2 | b1 | Meaning |
|---|---|---|---|---|---|---|---|---|
| x | X | x | x | x | x |   |   | Time Value |
|   |   |   |   |   |   | x | x | Time Unit |

As seen from Table 3, bits b3 to b8 of the PTCi represents the time value which indicates a maximum amount of time for which the initiator will transfer power to the target device, while the least significant bits b2 and b1 of the PTCi represents the unit of the captured time value. Table 4 given below gives the time unit coding information.

TABLE 4

| b2 | b1 | Meaning |
|---|---|---|
| 0 | 1 | Seconds |
| 1 | 0 | Minutes |
| 1 | 1 | Hours |
| Others |  | RFU |

In Table 2, Byte 14 includes PCPi which represents the initiator device power transmission control parameters. Table 5 gives the PCPi format as

TABLE 5

| b8 | b7 | b6 | b5 | b4 | b3 | b2 | b1 | Meaning |
|---|---|---|---|---|---|---|---|---|
| x | X | x | x | x | x |   |   | Verification Time Interval |
|   |   |   |   |   |   | x | x | PTMi |

From Table 5, bits b3 to b8 of the PCPi indicates a verification time interval within which the presence of the target device will be verified. This will be represented in seconds. The verification time interval value is used only if a Power Transmission Mode (PTMi) represented by bits b2 and b1 has the value 01; otherwise this value is ignored by the target device. The least significant bits b2 and b1 of the PCPi indicate the initiator's Power Transmission Mode (PTMi) and are used to determine the mode in which power will be transmitted.

Table 6 below gives different power modes used in PTMi coding.

TABLE 6

| b2 | b1 | Meaning |
|---|---|---|
| 0 | 1 | Start Power Transmission |
| 1 | 0 | Stop Power Transmission |
| 1 | 1 | Both Power and Data Transmission |
| Others | | RFU |

The initiator follows certain predefined rules with respect to bits b1 and b2 of PTMi represented in Table 6. If the coded bits of PTMi have the value 01 in PCPi of PWT_REQ at operation 308, then the initiator will send PWT_REQ after the completion of initialization and anti-collision procedure to notify the target device to switch to power reception state. When the initiator has sent the PWT_REQ and receives a valid PWT_RES, the initiator continues with power transmission using an unmodulated carrier signal, and the initiator will continuously send PWT_REQ in Verification Time Interval until an application specifies to stop power transmission or the initiator has transferred power for the time value received in PWT_RES.

If coded bits of PTMi is the value 10 in PCPi of PWT_REQ at operation 309, then the initiator will send PWT_REQ with PTMi bits b2 and b1 set as 10 to the target indicating that the initiator will stop power transmission and indicate the target device to switch back to the initial state to perform standard NFC device function. Further, the initiator will receive valid PWT_RES, indicating that the target has been successfully halted and will stop receiving power.

If coded bits of PTMi are the value 11 in PCPi of PWT_REQ at operation 311, then the initiator indicates the target device to switch to power reception with data exchange state by sending PTMi value as 11 in PWT_REQ. When the initiator has sent PWT_REQ and receives a valid PWT_RES from the target, the initiator continues with Data Exchange Protocol (DEP) initialization by sending ATR_REQ as defined in ISO/IEC_18092. If the initiator did not find any of these modes, then the initiator ignores the value at operation 311 as an invalid mode value.

If the bits b1 and b2 of PTMi are set to an invalid mode, then the value will be ignored.

The PWT_RES sent by the selected NFCIP-1 target device to the initiator may have a format as given in Table 7 below.

TABLE 7

| BYTE1 | BYTE2 | BYTE3 | ... | BYTE12 | BYTE13 |
|---|---|---|---|---|---|
| D5 | 0D | Nfcid3t0 | ... | Nfcid3t9 | PTCt |

As seen in Table 7, the NFCID3t is the NFC forum NFCIP-1 identifier of the target for NFC-PWT protocol. The PTCt represents the target's power transmission control parameters. PTCt is represented as in Table 8 below.

TABLE 8

| b8 | b7 | b6 | b5 | b4 | b3 | b2 | b1 | Meaning |
|---|---|---|---|---|---|---|---|---|
| x | x | x | x | x | x | | | Time Value |
| | | | | | | x | x | Time Unit |

In Table 8, the bits b3 to b8 of the PTCt represents the time value. The target specifies the amount of time for which the target would like to request the initiator to transfer power. This value is less than the time value received as part of PWT_REQ. If this value is more than the time value specified by the initiator, then this response will be ignored by initiator. The least significant bits b1 and b2 of the PTCt represents the unit of the captured time value given in Table 9 below.

TABLE 9

| b2 | b1 | Meaning |
|---|---|---|
| 0 | 1 | Seconds |
| 1 | 0 | Minutes |
| 1 | 1 | Hours |
| Others | | RFU |

The target follows a set of predefined rules when the target detects bit codes in the received PTMi in PCPi of PWT_REQ. If the PTMi is received as 01, then the target will send PWT_RES if the verification time interval in PWT_REQ received from the initiator has been accepted by the target, indicating that the target will switch to power reception state using control module 202. In the power reception state, the target charges the battery present in power module 204 using power induced in the antenna 205 through regulator module 203. Otherwise, the target will not send PWT_RES and move to SENSE state or throw a protocol error if the verification time interval in PWT_REQ received from the initiator is not accepted by the target.

If bits b1 and b2 of PTMi are received as 10 in PCPi of PWT_REQ, then the target will send PWT_RES to the initiator, indicating that the target will stop power reception and switch back to an initial state of standard NFC function using control module 202. If PTMi is received as 11 in PCPi of PWT_REQ, then the target will send the PWT_RES. After sending the PWT_RES, the target moves to power reception with data exchange state using control module 202. The target detects the excess power using the voltage/current sensing module 201, and charges the battery present in the power module 204 using the regulator module 203. The various actions shown in FIG. 3 may be performed in the order presented or in a different order. Further, in some embodiments, some actions listed in FIG. 3 may be omitted.

A Logical Link Control Protocol (LLCP) provides a procedural mechanism for the transfer of upper layer information units between two NFC Devices. In LLCP Payload Type (PTYPE) is used to define the purpose of the Payload Data Unit (PDU). Four bits are used to represent PTYPE, which gives sixteen different possible PTYPEs. Among these sixteen possible PTYPEs, twelve PTYPEs are defined and used by the NFC forum and remaining four PTYPEs are left for future use. The methods described herein use two of these four reserved PTYPES to control the power transmission. The methods add two new PDU types: Power Transmission (PT) and Response to Power Transmission (RPT). The PT PDU is an unnumbered PDU which is used to inform the target device about the initiator's power transmission mode. The PT PDU may have the format shown below in Table 10.

TABLE 10

| DSAP | PDU TYPE | SSAP | Information |
|---|---|---|---|
| DDDDDD | 1001 | SSSSSS | Control Parameters |

The control parameters represented in Table 10 are represented in a byte. The first 6 bits represent a verification time interval (which is as similar as mentioned in PCPi) and the last two bits represent the mode value. The different mode values are given in Table 11 below.

TABLE 11

| Value | Description |
|---|---|
| 01h | Indicates that the initiator wants the target to switch to power reception mode |
| 10h | Indicates that the initiator wants the target to switch off power reception mode and move to data exchange mode |
| 11h | Indicates that the initiator wants the target to switch to power reception with data exchange mode |
| Other Values | Not used by LLCP |

The Response for Power Transmission (RPT) is an unnumbered PDU, which is used to acknowledge to the initiator that the target device is ready for power reception according to the initiator's power transmission mode. The RPT PDU may have the format shown in Table 12 below.

TABLE 12

| DSAP | PDU TYPE | SSAP |
|---|---|---|
| DDDDDD | 1010 | SSSSSS |

Figure 4:
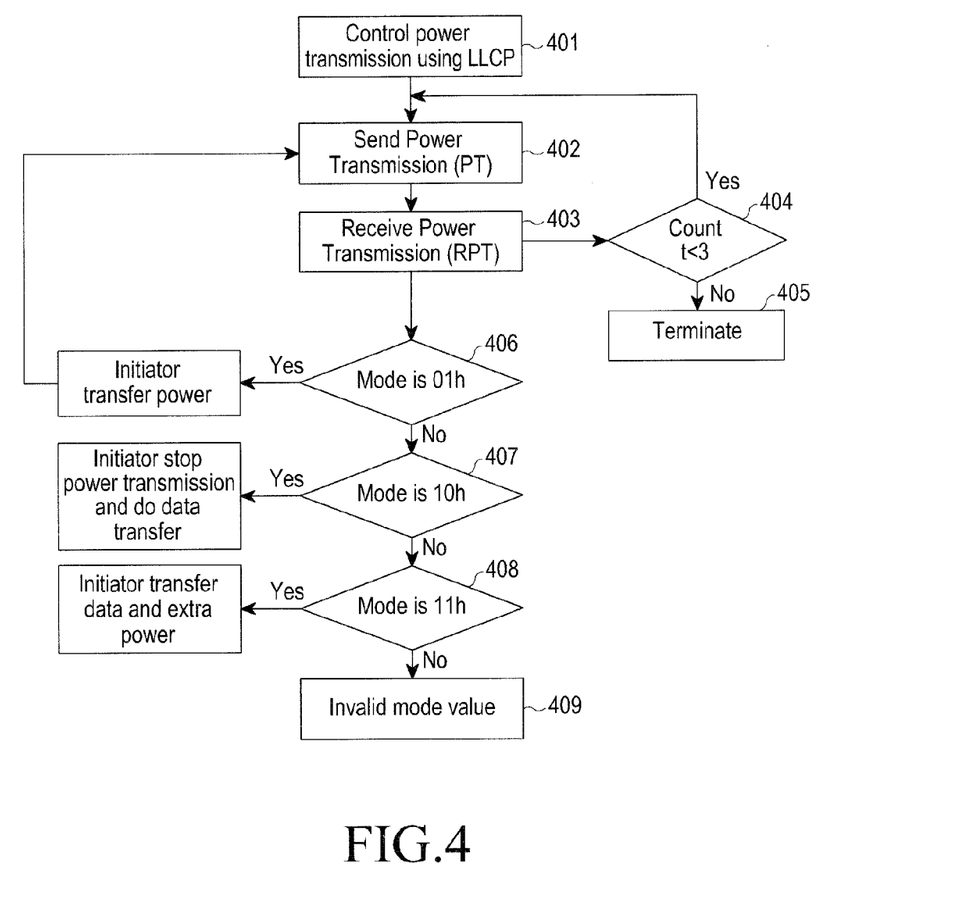
FIG. 4 illustrates a flow diagram explaining a process of power transmission by an initiator using Logical Link Control Protocol (LLCP) according to various embodiments of the present disclosure.

FIG. 4 illustrates a flow diagram explaining a process of power transmission by an initiator using LLCP according to various embodiments of the present disclosure.

Referring to FIG. 4, the modified LLCP used by the initiator enables the application to control at operation 401 power transmission using LLCP. The initiator sends the Power Transmission (PT) command at operation 402 and in response receives at operation 403 a Response to Power Transmission (RPT) from the target. If the initiator has sent PT and has not received RPT, the initiator will resend PT up to 3 times. If no RPT is received within this count, then the LLCP connection is terminated at operation 405 and Medium Access Control (MAC) is notified.

On receiving the RPT within the defined time limit, the initiator determines the power transmission mode to be initiated and operates accordingly. The initiator follows certain rules while handling PT and RPT PDUs. If the mode value in PT identified at operation 406 is 01h, then the initiator transfers only power and does not exchange any data for verification time interval. After receiving RPT, the initiator transmits power for verification time interval using an unmodulated carrier signal. The initiator resends PT after transferring power for the verification time interval. If the initiator has sent PT and has not received RPT, the initiator resends PT for a count N (<3) times. Otherwise, the LLCP connection is closed and the MAC notified. If the mode value identifier in PT is 10h at operation 407, then the initiator stops power transmission. After receiving RPT, the initiator performs data transfer. If the initiator has sent PT and has not received RPT, then the initiator resends PT for N (<3) times; otherwise, the LLCP connection is closed and the MAC notified.

If the mode value in PT is identified at operation 408 as 11h, then the initiator transfers data and extra power, and if the initiator has sent PT and has not received RPT, then the initiator resends PT for N (<3) times or else the LLCP connection is closed and the MAC notified. If the mode value of PT is not a valid mode, then the mode value is ignored by the initiator. If the initiator did not find any of the above mentioned modes, then the mode value is ignored at operation 409. The various actions in the method shown in FIG. 4 may be performed in the order presented or in a different order. Further, in some embodiments, some actions listed in FIG. 4 may be omitted.

Certain steps may be followed during this power transmission process. For example, the application at the initiator may control power transmission using LLCP, the application may finalize the total amount of time for which power needs to be transferred to the target based on the available power in battery, or after finalizing the time duration, the application may start the power transmission by sending PT with mode value as 01h. If the initiator/target has moved out in between the power transmission, then the LLCP may send the notification to the application and/or the MAC, and after the calculated time duration the application may stop the power transmission by sending PT with mode value as 10h.

Figure 5:
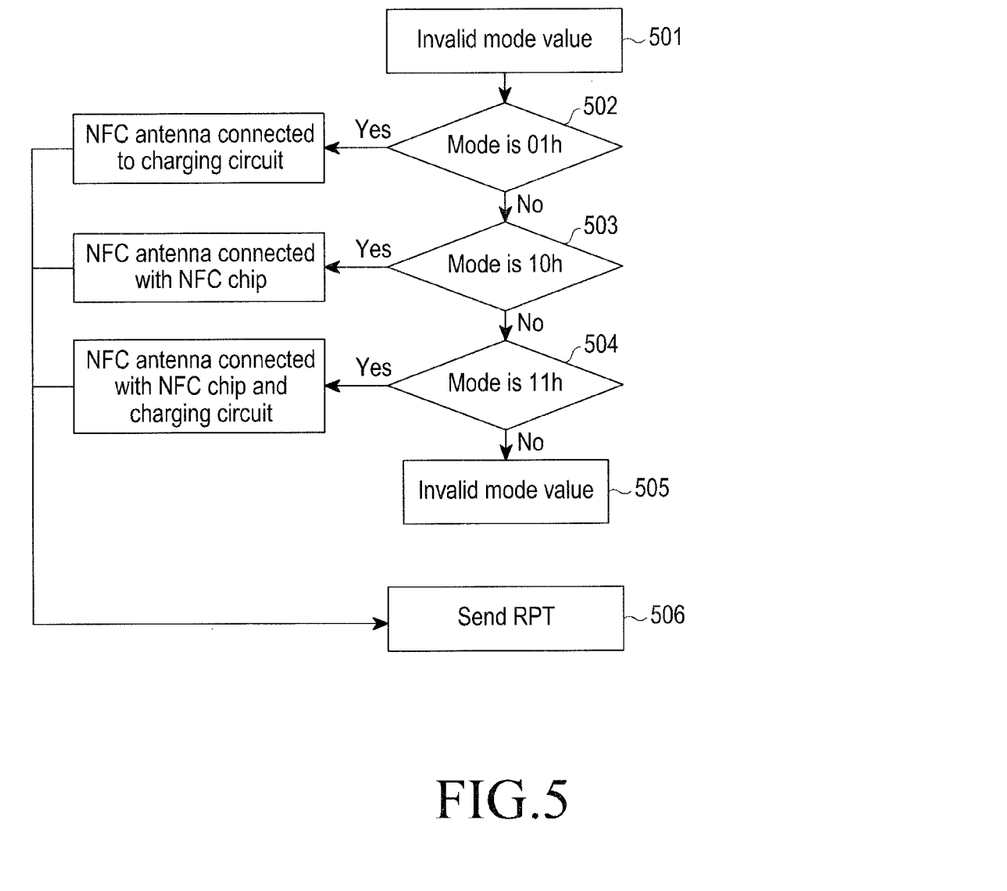
FIG. 5 illustrates a flow diagram of a target device after receiving power from an initiator using LLCP according to various embodiments of the present disclosure.

FIG. 5 illustrates a flow diagram of a target device after receiving power from an initiator using LLCP according to various embodiments of the present disclosure.

Referring to FIG. 5, the target receives at operation 501 a PT PDU from the initiator and analyzes the last two bits of control parameters represented in Table 11 to decide further actions to be carried out. The target follows different rules for different power transmission modes from initiator. If the target determines that the mode value in control parameter of PT is 01h at operation 502, then the target sends RPT at operation 506 on acceptance of verification time interval. After sending RPT, the target changes to power reception mode using the control module 202. In this mode, the target charges the battery of power module 204 by regulating the power induced in antenna 205 for verification time interval. In addition, the target will expect PT from the initiator after receiving power for verification time interval. If the target does not receive PT after receiving power for verification time interval, then the target moves to disconnect mode and switches to standard NFC function.

If the target determines that the mode value in PT is 10h at operation 503, then the target sends RPT at operation 506 and ignores the verification interval time value. After sending RPT, the control module 202 in the target switches off from power reception mode and the target may start data exchange. The target will expect data from the initiator and will not charge. If the target determines that the mode value in PT is 11h at operation 504, then the target sends RPT at operation 506 and ignores the verification time interval value. After sending RPT, the target changes to power reception with data exchange mode using the control module 202. Whenever excess power is detected by the voltage/current sensing module 201 in the received data, the target uses the excess power for charging the battery in the power module 204 using the regulator module 203. If the target determines that the received PT does not contain any of the above mentioned modes, then the target ignores the PT at operation 505 as an invalid mode, and the target continues operating as a standard NFC device. The various actions in method 500 may be performed in the order presented or in a different order. Further, in some embodiments, some actions listed in FIG. 5 may be omitted.

Figure 6:
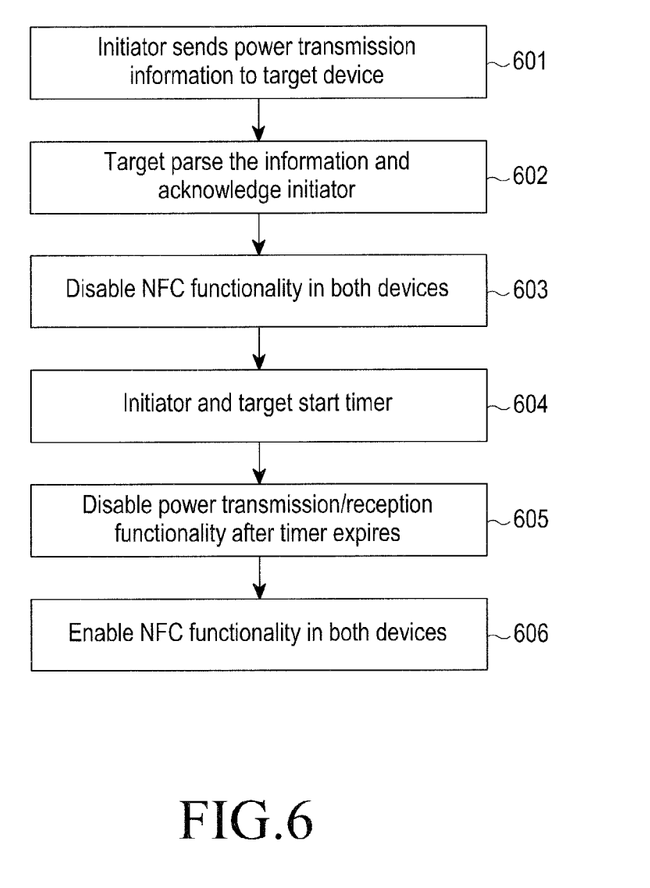
FIG. 6 illustrates a flow diagram explaining application flow control of power transmission without data exchange between an initiator and a target NFC device according to various embodiments of the present disclosure.

FIG. 6 illustrates a flow diagram explaining an application flow control of power transmission without data exchange between an initiator and a target NFC device according to various embodiments of the present disclosure.

Referring to FIG. 6, the initiator and the target NFC enabled devices follow power transmission without data transfer from initiator to target NFC enabled devices, using any application logic. The initiator sends at operation 601 information to the target containing different parameters, such as initiator device power transmission capacity, device verification time interval with mode of transmission, speed of transmission, and the like. The parameters to be sent may be determined by the application logic. The parameter values may vary depending on the type of NFC devices in operation. The NFC type may represent NFC-A and NFC-F present in network.

The target device parses at operation 602 the received information from the initiator. Once the target identifies the initiator, the target determines whether the power delivering capacity of the initiator is sufficient as per target demand, and whether the NFC enabled device types match. This operation enables mutual understanding or synchronization between the target and the initiator. Then the target acknowledges the initiator. The target may also inform the initiator if the target is still in the range of the initiator. If no mutual understanding takes place due to mismatch in parameters, the target does not send any acknowledgement and no further communication will be carried on for power transfer.

If synchronization is achieved, then the target sends the acknowledgement, further communication, and application logic in both the target and the initiator disables NFC functionality and initiates power transmission mode in operation 603 instead of the regular data transmission mode. In addition, both the initiator and the target starts a timer and switches to power transmission or reception mode at operation 604 by controlling the hardware with the help of the control module 202. The timer ensures that the initiator stops power transmission after preset, which avoids power wastage by the initiator if the target moves out of range after power transmission has been initiated. Once the timer expires, the power transmission or reception is disabled at operation 605 and both the target and the initiator are enabled at operation 606 to carry out normal NFC functions. The various actions shown in FIG. 6 may be performed in the order presented or in a different order. Further, in some embodiments, some actions listed in FIG. 6 may be omitted.

A user of the initiator NFC enabled device may decide the percentage of power to be transmitted to the target NFC enabled device.

Figure 7:
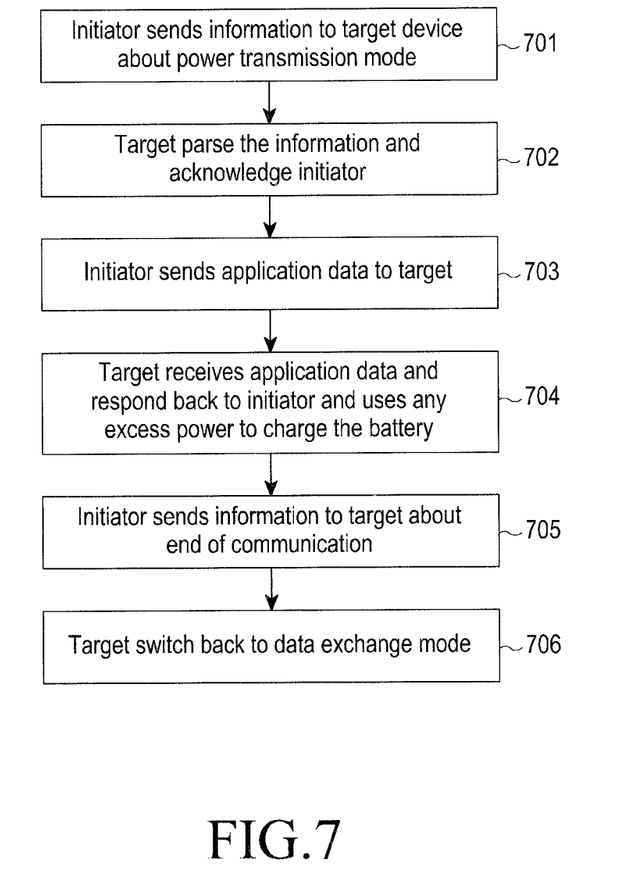
FIG. 7 illustrates a flow diagram explaining an application flow control of power transmission with data exchange between an initiator and a target NFC device according to various embodiments of the present disclosure.

FIG. 7 illustrates a flow diagram explaining an application flow control of power transmission with data exchange between an initiator and a target NFC device according to various embodiments of the present disclosure.

Referring to FIG. 7, the initiator and the target NFC enabled devices follow power transmission along with data transfer from initiator to target, using any application logic. The initiator sends information to the target at operation 701, such as initiator device power transmission capacity, device verification time interval with mode of transmission, speed of transmission, and the like. The target parses this received information at operation 702. Once synchronization and mutual understanding is confirmed, the target acknowledges the initiator as well as enables a charging circuit including the voltage/current sensing module 201, which is used to charge the target's battery in the power module 204. On receiving acknowledgement from the target, the initiator sends application data to the target at operation 703. The target receives this application data at operation 704 and responds back to the initiator. The target uses any excess energy induced in the antenna 205 for charging the battery. The target uses the minimum required power in the application data signal received to detect the data sequence of zeroes and ones. The voltage/current sensing module 201 determines the power required for circuit actuation from the power induced in NFC antenna; any excess power in this data signal is used to charge the battery using the control module 202. Once the initiator completes data transmission, the initiator sends at operation 705 an end of communication indication which signals the target to disable the charging circuit. Finally, the target switches back to normal NFC application at operation 706, which is a data transfer mode. The various actions shown in FIG. 7 may be performed in the order presented or in a different order. In addition, in some embodiments, some actions listed in FIG. 7 may be omitted.

Figure 8:
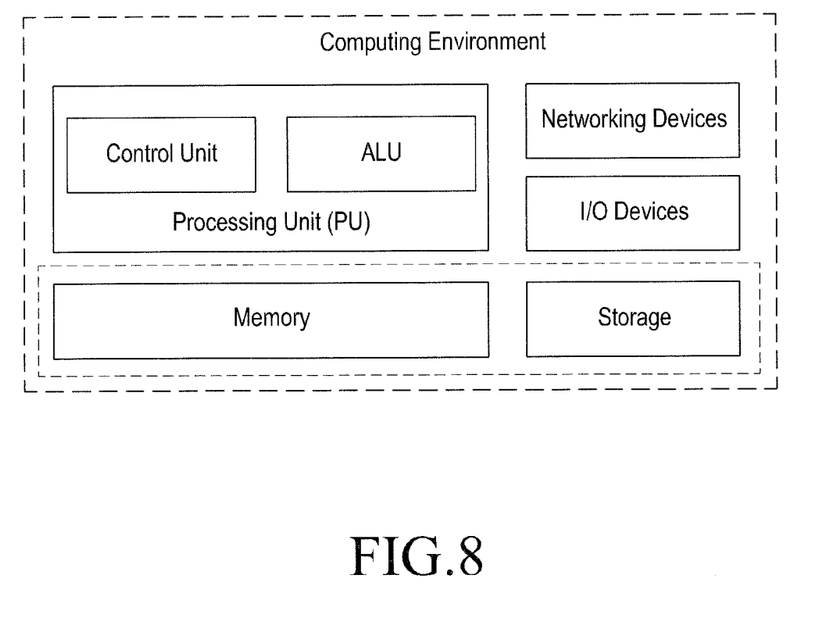
FIG. 8 illustrates a computing environment implementing an application according to various embodiments of the present disclosure.

FIG. 8 illustrates a computing environment implementing an application according to various embodiments of the present disclosure.

Referring to FIG. 8, the computing environment comprises at least one processing unit that is equipped with a control unit and an Arithmetic Logic Unit (ALU), a memory, a storage unit, a plurality of networking devices, and a plurality of Input/Output (I/O) devices. The processing unit is responsible for processing the instructions of the algorithm. The processing unit receives commands from the control unit. Any logical and arithmetic operations involved in the execution of the instructions are computed with the help of the ALU.

The overall computing environment may be composed of multiple homogeneous and/or heterogeneous cores, multiple CPUs of different kinds, special media, and other accelerators. The processing unit is responsible for processing the instructions of the algorithm. The processing unit receives commands from the control unit in order to perform its processing. Any logical and arithmetic operations involved in the execution of the instructions are computed with the help of the ALU. The plurality of processing units may be located on a single chip or over multiple chips.

The algorithm including instructions and codes used for the implementation of the above-described or similar methods are stored in one or both of the memory unit or the storage. At the time of execution, the instructions may be fetched from the corresponding memory and/or storage, and executed by the processing unit.

In case of any hardware implementations, various networking devices or external I/O devices may be connected to the computing environment to support the implementation through the networking unit and the I/O device unit.

The various embodiments disclosed herein may be implemented through at least one software program running on at least one hardware device and performing network management functions to control the elements. The elements shown in FIGS. 1, 2, and 8 include blocks which can be at least one of a hardware device, or a combination of hardware device and software module.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalent.

What is claimed is:

1. A method for transferring by an initiator Near Field Communication (NFC) device, power to a target NFC device, the method comprising:
    switching, if an external radio frequency (RF) field is not detected within a predetermined time, an operation mode of the initiator NFC device to an active NFC mode for activating the target NFC device;
    transmitting, if a request for transferring power is received from the target NFC device, a command including information on a device verification time interval to the target NFC device;
    transferring, if a response to the command is received from the target NFC device, at least a portion of power in the initiator NFC device to the target NFC device; and
    verifying the target NFC device at the device verification time interval during the transferring of the at least the portion of the power to the target NFC device,
    wherein the initiator NFC device transfers power by modifying one or more of a digital protocol, a Logical Link Control Protocol (LLCP), and an application flow control of the initiator NFC device.

2. The method as in claim 1, wherein the initiator NFC device transfers data to the target NFC device.

3. The method as in claim 1, wherein the initiator NFC device further sends information about a power transmission capacity along with the information on the device verification time interval to the target NFC device.

4. The method as in claim 1, wherein the target NFC device sends an acknowledgement on receiving the power transmission information from the initiator NFC device.

5. The method as in claim 4, wherein the acknowledgement comprises one or more of information about the target NFC device or a power requirement of the target NFC device.

6. An initiator Near Field Communication (NFC) device for transferring power to a target NFC device, the initiator NFC device comprising:
    an antenna; and
    a circuit including one or more of an NFC operational components module, a voltage sensing module, a current sensing module, a control module, a regulator module, or a power module,
    wherein the control module is configured to:
        switch, if an external radio frequency (RF) field is not detected within a predetermined time, an operation mode of the initiator NFC device to an active NFC mode for activating the target NFC device;
        transmit, if a request for transferring power is received from the target NFC device, a command including information on a device verification time interval to the target NFC device;
        transfer, if a response to the command is received from the target NFC device, at least a portion of power in the initiator NFC device to the target NFC device using the antenna, and
        verify the target NFC device at the device verification time interval during the transferring of the at least the portion of the power to the target NFC device,
    wherein the initiator NFC device transfers power by modifying one or more of a digital protocol, a Logical Link Control Protocol (LLCP), and an application flow control of the initiator NFC device.

7. The initiator NFC device as in claim 6, wherein the initiator NFC device is configured to transfer data to the target NFC device.

8. The initiator NFC device as in claim 6, wherein the initiator NFC device is configured to send information about power transmission capacity along with the information on the device verification time interval to the target NFC device.

9. The initiator NFC device as in claim 6, wherein the control module is configured to switch the initiator NFC device between different modes based on control signals received from the NFC operational components module.

10. A target Near Field Communication (NFC) device for receiving power transferred from an initiator NFC device, the target device comprising:
    an antenna; and
    a circuit including one or more of an NFC operational components module, a voltage sensing module, a current sensing module, a control module, a regulator module, or a power module,
    wherein the control module is configured to:
        transmit, to the initiator NFC device, a request for transferring power;
        receive a command including information on a device verification time interval from the initiator NFC device;
        transmit, to the initiator NFC device, a response to the command; and
        receive the power from the initiator NFC device using the antenna,
    wherein the target NFC device is verified, by the initiator NFC device, at the device verification time interval during receiving the power, and
    wherein the target NFC device receives the power from the initiator NFC device by modifying one or more of a digital protocol, an LLCP, and an application flow control of the target NFC device.

11. The target NFC device as in claim 10, wherein the target NFC device is configured to send an acknowledgement on receiving the power transmission information from the initiator NFC device.

12. The target NFC device as in claim 10, wherein the acknowledgement comprises one or more of information about the target NFC device or a power requirement of the target NFC device.

13. The target NFC device as in claim 10, wherein the voltage sensing module is configured to detect excess power based on power received from the antenna and the power required for activating NFC operational components module, and
    wherein the excess power is used to charge a battery included in the power module using the regulator module.

14. The target NFC device as in claim 10, wherein the current sensing module is configured to detect excess power based on the power received from the antenna and the power required for activating the NFC operational components module, and
    wherein the excess power is used to charge a battery included in the power module using the regulator module.

15. The target NFC device as in claim 10, wherein the control module is configured to switch the target NFC device between different modes based on control signals received from the NFC operational components module.

* * * * *